US005867793A

United States Patent [19]
Davis

[11] Patent Number: 5,867,793
[45] Date of Patent: Feb. 2, 1999

[54] BUILT-IN, CELLULAR TELEPHONE MESSAGE RECORDER

[76] Inventor: Eddie Davis, 6947 Coal Creek Pkwy., Suite 1500, Newcastle, Wash. 98059

[21] Appl. No.: 504,737

[22] Filed: Jul. 20, 1995

[51] Int. Cl.[6] .................... H04Q 7/32

[52] U.S. Cl. .................... 455/556; 455/412

[58] Field of Search .................... 379/58, 59, 61, 379/67, 88, 428, 433, 89; 455/89, 90, 344, 412, 413, 550, 556, 575

[56] References Cited

U.S. PATENT DOCUMENTS

| | | | |
|---|---|---|---|
| 4,121,060 | 10/1978 | Bohnhoff | 369/29 |
| 4,340,784 | 7/1982 | McQueen et al. . | |
| 4,481,382 | 11/1984 | Villa-Real | 379/61 |
| 4,843,498 | 6/1989 | Graf von Zedlitz und Trutzschler | 360/93 |
| 5,001,743 | 3/1991 | Lenaerts | 379/67 |
| 5,003,576 | 3/1991 | Helferich | 379/88 |
| 5,111,500 | 5/1992 | Afshar et al. | 379/67 |
| 5,247,700 | 9/1993 | Wohl et al. | 455/33.1 |
| 5,740,543 | 4/1998 | Maeda | 455/550 |

FOREIGN PATENT DOCUMENTS

90/13196 11/1990 WIPO .

OTHER PUBLICATIONS

AT&T Answering System 1721 Owner's Manual Dec. 1993.

*Primary Examiner*—Dwayne D. Bost
*Assistant Examiner*—William G. Trost
*Attorney, Agent, or Firm*—Dean A. Craine

[57] ABSTRACT

A cellular telephone with a message recorder built into its handset for conveniently recording selected portions of a cellular telephone call. In the preferred embodiment, the message recorder is a digital type message recorder which includes control buttons located on the handset which enable the user to selectively record, play, rewind, forward, and erase messages. The message recorder is connected to the cellular telephone's earpiece so that the recorded message can be played back therethrough for greater privacy and improved hearing. An optional switch is connected between the cellular telephone circuit and the handset's microphone so that a message spoken into the microphone may be recorded.

2 Claims, 1 Drawing Sheet

14
50
20
60
CELLULAR TELEPHONE CIRCUITRY
MESSAGE RECORDER
30
32
34
36
38
40
16
EARPIECE

BUILT-IN, CELLULAR TELEPHONE MESSAGE RECORDER

BACKGROUND OF THE INVENTION

1. Field of the Invention

This invention relates to playback message recorders and, more particularly, to such playback message recorders built into the handset of a cellular telephone.

2. Description of the Related Art

Today, cellular telephones enable individuals to make and receive telephone calls nearly anywhere in the United States. Often, cellular phone users make or receive telephone calls at locations which do not allow them to manually record the information conveyed during the conversation. For example, to manually record information during a cellular phone call while driving, the user must either stop the vehicle immediately and record the message or must call the caller back and record the information at a later time. In some instances, the driver may attempt to manually record the message while driving which, of course, may cause an accident.

For a variety of reasons, the voice information conveyed in a cellular telephone call is often broken or incomplete. Due to their greater mobility, cellular telephones are often used in environments that have loud background noises which make the information inaudible.

A device capable of overcoming these problems is a cellular telephone with a built-in message recorder which can be selectively operated using the hand which holds the handset and which allows the messages to be played back directly into the earphone on the handset.

SUMMARY OF THE INVENTION

It is an object of the invention to provide a message recorder capable of selectively recording portions of a telephone conversation on a cellular phone.

It is another object of the invention to provide such a recorder which is built into the handset of the cellular phone.

It is a further object of the invention to provide such a cellular phone in which the recorded messages are be played back through the earpiece on the handset.

These and other objects are met by providing a cellular telephone with a message recorder built into the handset of the cellular telephone. When using the message recorder, the user is able to record a portion of the telephone conversation for playback at a later time. The controls for the message recorder are conveniently located on the handset so that the user may selectively operate the message recorder using the same hand holding the handset. The message recorder is electrically connected to the earpiece on the handset so that messages are heard through the earpiece, for greater privacy and reduce interference from the surrounding environment.

DESCRIPTION OF THE PREFERRED EMBODIMENT(S)

Figure 1:
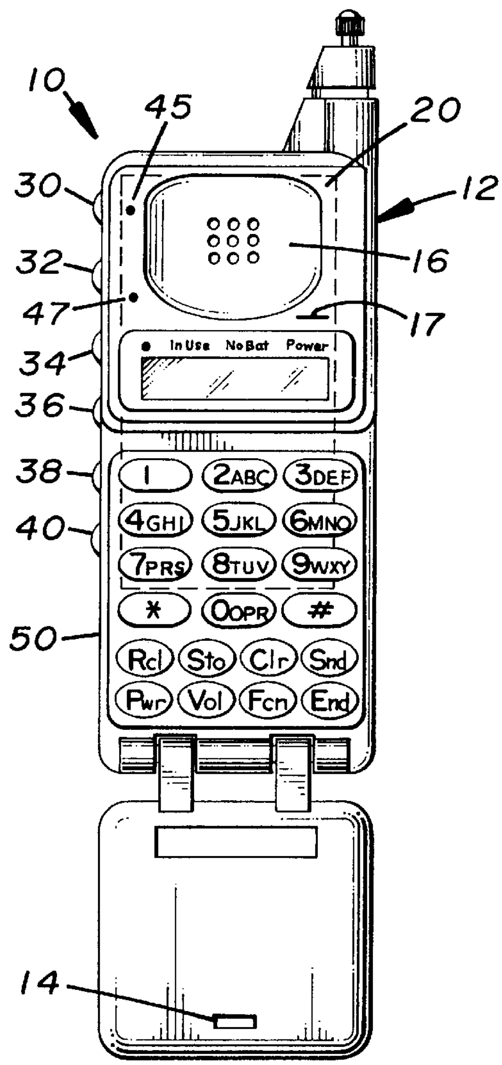
FIG. 1 is a front elevational view of a cellular telephone with a built-in message recorder.
Figure 2:
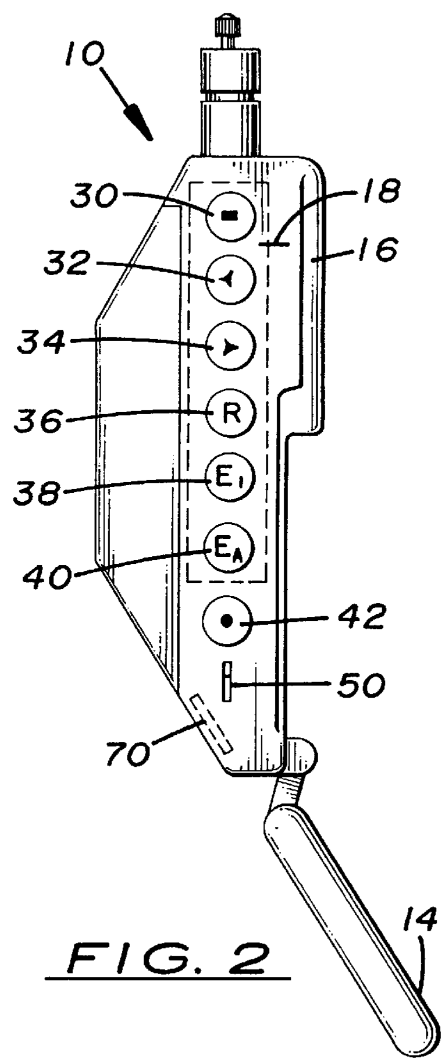
FIG. 2 is a side elevational view of the cellular telephone shown in FIG. 1.
Figure 3:
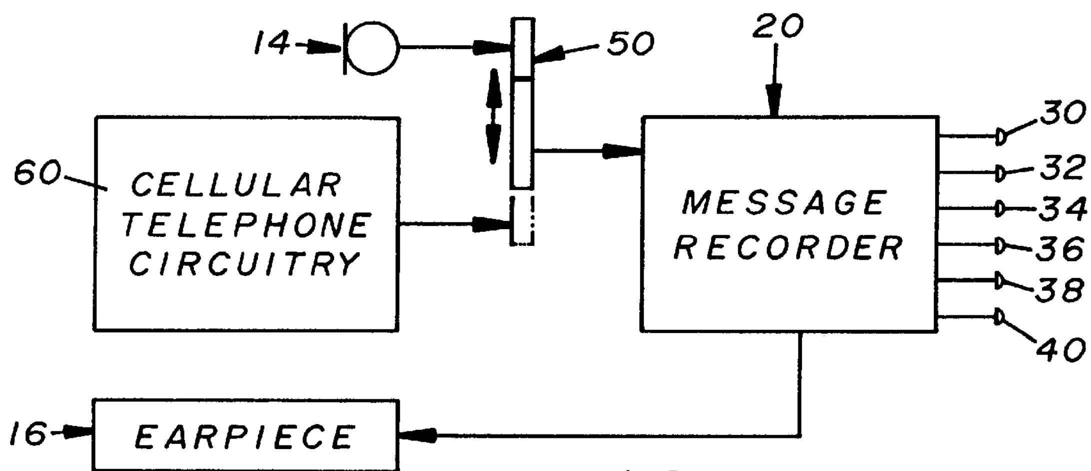
FIG. 3 is a block diagram showing the relationships of the components used in the invention.

Shown in the accompanying FIGS. 1–3, there is shown a cellular telephone 10 with a digital message recorder 20 built into the handset 12. When using the message recorder 20, the user is able to record a portion of the telephone conversation for playback at a later time. The controls for the message recorder 20 are also conveniently located on the handset 12 so that the user may selectively operate the message recorder 20 using the same hand holding the handset 12. The message recorder 20 is electrically connected to the earpiece 16 on the handset 12 so that recorded messages may be heard through the earpiece 16, for greater privacy and reduced interference from the surrounding environment.

The handset 12 includes a mouthpiece 14 and an earpiece 16 with the message recorder 20 located therebetween. In the preferred embodiment, the message recorder 20 is a digital type message recorder which is compact and capable of being housed inside the handset 12 of a typical cellular telephone 10. The digital message recorder 20 used is nearly identical to the digital recorder commonly used in personal note recorders. An example of such a message recorder is the personal note recorder distributed by Voice It Worldwide and sold under the trademark VOICE IT™. Such devices are able to record up to approximately ten messages for a total recording time of forty seconds. The messages can be erased selectively allowing the user to erase unneeded messages and record new messages. Such devices also include forward and rewind buttons which enable the user to find messages quickly. The electric circuit used in the personal note recorder distributed by Voice It Worldwide is incorporated herein. In other embodiments, the message recorder 20 can be an analog tape message recorder as formed with mini or micro tape recorders.

Attached to the side surface 18 of the handset 12 are a plurality of control buttons 30–40 used to control the various functions on the message recorder 20. In the preferred embodiment, the control buttons include a PLAY button 30, a REWIND button 32, a FORWARD button 34, a RECORD button 36, an ERASE (1) button 38, an ERASE (2) button 40, and a MESSAGE button 42. The ERASE (1) button 38 is used to erase the latest recorded message while the ERASE (2) button is used to erase all of the recorded messages. The MESSAGE button 42 is used to replay all of the recorded messages. To replay the latest message, simply press the PLAY button 36.

Located on the front surface 17 of the handset 12 is an optional red light indicator 45 electrically connected to the message recorder 20. When a message is being recorded, the red light indicator 45 is activated. Also located on the front surface 17 of the handset 12 is an optional green light indicator 47 electrically connected to the message recorder 20. During use, the green light indicator 47 is activated when the message is playing back.

In another embodiment, the cellular telephone 10 includes an optional switch 50 electrically connected between the cellular telephone circuit 60 and the message recorder 20 and the handset's microphone 14. As shown in FIG. 3, the switch 50 is a single pole, double throw switch which selectively controls the electrical signal input into the message recorder 20. During normal operation, the switch 50 is disposed in a first position so that the electrical signal transmitted to the earpiece during a cellular telephone call is also delivered to the message recorder 20 for recording. Activating the record button 36 causes the message recorder 20 to record the message. When the switch 50 is disposed in the second position, the electrical signal from the microphone 14 is delivered directly to the message recorder 20 for recording. In this manner, the cellular telephone 10 may act not only as a personal note recorder but also as a dictating machine.

In the preferred embodiment, the message recorder 20 is electrically powered independently from the cellular telephone by lithium batteries 70 housed in the handset 12. In other embodiments, the message recorder 20 may be electrically powered by the cellular telephone battery.

To record a message, the RECORD button 36 is pressed and released. The optional red light 45 is on which indicates that a message is being recorded. To stop recording, the RECORD button 36 is pressed again and the red light 45 is turned off.

To play messages, press the PLAY button 30 and release. The green light indicator 47 is activated to replay all messages from the beginning, press the MESSAGE button 42 once then press the PLAY button 30 and hold for two seconds. All recorded messages will play from the start to finish. To replay messages one at a time, press the MESSAGE button 42 once, then press the PLAY button 30 and release. The first message will play and stop. Press the PLAY button 30 to hear each subsequent message.

To skip messages in reverse, press the REWIND button 32 once to skip one message. Hold the REWIND button 32 down to continue to rewind. To forward, press FORWARD button 34 once to skip one message and hold it down to the end of messages.

To erase messages selectively, first play the message you want to erase, then press ERASE (1) button 38 and hold until the red light indicator 45 flashes once. To erase all the messages recorded, press ERASE (2) button 40 and hold until the red light indicator 45 flashes twice.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

REFERENCE NUMBERS

1.
2.
3.
4.
5.
6.
7.
8.
9.
10. Cellular telephone
11.
12. Handset
13.
14. Microphone
15.
16. Ear piece
17. Front surface
18. Side surface
19.
20. Message recorder
21.
22.
23.
24.
25.
26.
27.
28.
29.
30. Play button
31.
32. Rewind
33.
34. Forward
35.
36. Record
37.
38. Erase 1
39.
40. Erase 2
41.
42. MES
43.
44.
45. Red light
46.
47. Green light
48.
49.
50. Switch
51.
52.
53.
54.
55.
56.
57.
58.
59.
60. Cellular telephone circuit
61.
62.
63.
64.
65.
66.
67.
68.
69.
70. Batteries
71.
72.
73.
74.
75.
76.
77.
78.
79.
80.
81.
82.
83.
84.
85.
86.
87.
88.
89.
90.
91.
92.
93.
94.

95.
96.
97.
98.
99.

I claim:

1. A cellular telephone having message recording and playback mechanisms:

a. a cellular telephone circuitry capable of transmitting and receiving cellular communications, said cellular telephone circuitry being located inside a handset with a built-in earpiece and microphone;

b. a message recording disposed inside said handset for recording a portion of a message from a caller, said message recorder being connected to said earpiece enabling a message recorded on said message recorder to be heard through said earpiece;

c. a control means for selectively controlling said message recorder for playing, rewinding, forwarding, recording, and erasing a message recorded on said message recorder; and, d. a single switch means connected between said cellular telephone circuitry and said message recorder, said switch means enabling a user to selectively control the source of the message to be recorded by said message recorder while said cellular circuitry is activated from either a caller using said cellular telephone circuitry or the user delivered to said microphone in said handset.

2. A cellular telephone as recited in claim 1, wherein said control means includes PLAY, REWIND, FORWARD, RECORD, ERASE 1 and ERASE 2 buttons located on said telephone handset.

* * * * *